United States Patent
McLean et al.

(10) Patent No.: US 8,616,233 B2
(45) Date of Patent: Dec. 31, 2013

(54) ROTARY FACE SEAL WITH ANTI-CROWNING FEATURES

(75) Inventors: Christopher R. McLean, Vancouver (CA); Michel P. LeBlanc, Vancouver (CA); Michael J. McKerrow, Delta (CA); Bowie G. Keefer, Vancouver (CA); Xiang Lu Kong, Calgary (CA); Alan O. Lebeck, Albuquerque, NM (US)

(73) Assignee: Air Products and Chemicals, Inc., Allentown, PA (US)

( * ) Notice: Subject to any disclaimer, the term of this patent is extended or adjusted under 35 U.S.C. 154(b) by 1023 days.

(21) Appl. No.: 12/496,347

(22) Filed: Jul. 1, 2009

(65) Prior Publication Data

US 2010/0001220 A1  Jan. 7, 2010

Related U.S. Application Data

(60) Provisional application No. 61/133,939, filed on Jul. 2, 2008.

(51) Int. Cl.
*F16K 51/00* (2006.01)

(52) U.S. Cl.
USPC ..................................... 137/246.22; 251/333

(58) Field of Classification Search
USPC .......................... 251/314, 172, 175, 332–334; 137/246.22
See application file for complete search history.

(56) References Cited

U.S. PATENT DOCUMENTS

| | | | |
|---|---|---|---|
| 2,747,600 A * | 5/1956 | Laurent | 251/172 |
| 2,939,672 A * | 6/1960 | Rich | 251/5 |
| 3,584,641 A * | 6/1971 | Milleville et al. | 251/172 |
| 3,656,498 A * | 4/1972 | Grove et al. | 137/246.22 |
| 3,658,450 A * | 4/1972 | Woodling | 251/175 |
| 3,716,215 A * | 2/1973 | Washbourn et al. | 251/358 |
| 3,718,335 A | 2/1973 | Dernedde et al. | |
| 3,747,630 A | 7/1973 | Hurrell | |
| 3,905,577 A * | 9/1975 | Karpenko | 251/333 |

(Continued)

FOREIGN PATENT DOCUMENTS

| CH | 685514 | 7/1995 |
|---|---|---|
| FR | 1.526.591 | 4/1968 |

(Continued)

OTHER PUBLICATIONS

U.S. Appl. No. 60/886,484, Christopher Stoner.

(Continued)

*Primary Examiner* — John Bastianelli
(74) *Attorney, Agent, or Firm* — Eric J. Schaal

(57) ABSTRACT

A typical rotary face seal employs a seal ring rotating relative to a sealing surface and also employs means to urge the seal ring towards the sealing surface in order to effect a seal. The seal ring may itself comprise a seal face bonded to a backing ring. In certain applications, the seal face may deform significantly as a result of the temperature variations experienced and an undesirable crowning of the seal face may occur. Such crowning may be reduced by employing an improved seal ring with anti-crowning features in which the thickness of an edge of the seal face is different from that in the middle of the seal face, or in which a relief slot is employed in the seal face. The improved seal ring is particularly suited for rotary face seals used in a rotary valve in a rotary gas separation device.

50 Claims, 7 Drawing Sheets

(56) References Cited

U.S. PATENT DOCUMENTS

| | | | | |
|---|---|---|---|---|
| 4,067,542 A | * | 1/1978 | Morrison | 251/328 |
| 4,071,041 A | * | 1/1978 | Moran et al. | 251/360 |
| 4,124,676 A | | 11/1978 | Henzl | |
| 4,248,915 A | | 2/1981 | Vinciguerra | |
| 4,376,526 A | * | 3/1983 | Freeman | 251/360 |
| 4,471,943 A | * | 9/1984 | Nelson | 251/363 |
| 4,625,942 A | * | 12/1986 | Nelson | 251/172 |
| 4,635,674 A | * | 1/1987 | Bajka | 251/175 |
| 4,844,411 A | * | 7/1989 | Nelson | 251/214 |
| 4,850,599 A | | 7/1989 | Parmar | |
| 6,068,163 A | * | 5/2000 | Kihm | 251/321 |
| 6,488,265 B2 | * | 12/2002 | Laskaris et al. | 251/315.09 |
| RE38,493 E | | 4/2004 | Keefer et al. | |
| 2006/0103073 A1 | | 5/2006 | Khonsari et al. | |

FOREIGN PATENT DOCUMENTS

| | | |
|---|---|---|
| WO | 9506212 A1 | 3/1995 |
| WO | 2008/089564 A1 | 7/2008 |
| WO | WO 2010/003000 | 1/2010 |

OTHER PUBLICATIONS

U.S. Appl. No. 60/886,486, Christopher Stoner, et al.
International Search Report dated Jan. 13, 2010 in International Application No. PCT/US2009/049419.

* cited by examiner

ROTARY FACE SEAL WITH ANTI-CROWNING FEATURES

CROSS REFERENCE TO RELATED APPLICATION

This application claims the benefit of the earlier filing date of U.S. Provisional Application No. 61/133,939, filed on Jul. 2, 2008. The entire disclosure of provisional application No. 61/133,939 is considered to be part of the disclosure of the accompanying application and is incorporated herein by reference.

FIELD

This disclosure concerns rotary face seals, such as for use in a rotary valve in rotary pressure swing adsorption devices. In particular, it concerns certain features employed in rotary face seals in order to maintain flatness and stabilize the seal against variations in temperature.

BACKGROUND

Rotary face seals typically comprise two contacting rings where one ring rotates with respect to the other. The seal is made between the opposing faces of the two contacting rings. Force is provided in some manner in order to maintain sealing contact between the rings.

Such rotary face seals are used for numerous commercial purposes. A relatively new application for rotary face seals has been for use in compact and/or rapid cycle pressure swing adsorption (PSA) devices. For instance, U.S. Pat. No. RE38,493, incorporated herein by reference, discloses such devices. Therein, rotary face seals form part of pressure balanced rotary distributor valves that are used to open and close the feed and product ends of the adsorbent beds employed in a PSA device. Various rotary pressure swing adsorption devices also are disclosed in U.S. Provisional Application Nos. 60/886,484 and 60/886,486, both of which are incorporated herein by reference. In addition, PCT application number PCT/CA2008/000148, titled "Gas Separation Device", filed Jan. 23, 2008, discloses a rapid cycle pressure swing adsorption (RCPSA) device which also employs rotary face seals in rotary valves used at both the feed and product ends of the adsorbent beds therein. In the embodiments disclosed by this PCT application, the force used to maintain contact between the sealing surfaces can be provided by various gases as opposed to being provided by mechanical means (e.g. springs).

Problems associated with temperature gradients and thermal distortion in rotary face seals have been encountered in the prior art and some solutions have been proposed. For instance, U.S. Pat. No. 4,850,599 discloses a rotary mechanical face seal having a construction which keeps the sealing faces substantially parallel in spite of thermal distortion of the seal face members.

In many PSA applications (such as in separating hydrogen from refinery waste streams), the temperature variations experienced by the rotary valves in the PSA device can be significant. In addition, significant temperature gradients may also exist across the rotary valve and/or seal components. For these reasons, it is important that the rotary face seals in these devices be sufficiently stable against variations in temperature and against temperature gradients.

SUMMARY

In some rotary face seal designs, we have found that undesirable distortion of the rotary face seal components may occur during events involving significant changes in operating temperatures due to thermal expansion when the thermal expansion coefficients of certain seal components differ too much. In particular, in designs that employ a seal ring comprising a seal face bonded to a backing ring, undesirable crowning of the seal face can occur if the thermal expansion coefficient of the seal face is much greater than that of the backing ring. This may be the case when certain polymers are used as the seal face material in combination with metals or metal alloys, such as steel, as the backing ring material. We have discovered that this crowning can be eliminated or reduced substantially and thus the seal can be stabilized against temperature variations by incorporating certain anti-crowning features into the seal ring.

In one disclosed embodiment, the pertinent rotary face seal comprises an improved seal ring, a sealing surface, and a sealing load to urge the seal ring towards the sealing surface. The seal ring rotates relative to the sealing surface about the seal ring axis, and either the seal ring or the sealing surface may be stationary. The seal ring comprises a seal face bonded to a backing ring. The side of the seal face opposite the backing ring contacts the sealing surface and is essentially flat. When the face seal is used in a rotary valve, the seal ring typically comprises at least one port (and often many) through both the seal face and the backing ring. And, the improved seal ring is characterized in that it comprises one or both of the following anti-crowning features: i) a thickness of an edge of the seal face that is different from the thickness of the middle of the seal face; and/or ii) a relief slot in the seal face.

In particular, when the seal face has a coefficient of thermal expansion that is greater than that of the backing ring, the thickness of an edge of the seal face is made greater than that of the middle of the seal face. In general, most or all of the seal face edges may be greater in thickness than that of the seal face middle. The backing ring is then made correspondingly thinner adjacent the thicker edge, or edges, of the seal face. Generally, abrupt discontinuities are avoided as the thickness of the seal face varies from the middle to its thicker edge or edges. Thus, in this region, the seal face may be angled or sloped to provide for a smooth, continuous transition in thickness. Material combinations for working embodiments include designs in which the backing ring is steel and the seal face is a carbon filled polytetrafluoroethylene. The thicker seal face edges can comprise both the outer and inner circumferences of the seal face. The thicker seal face edges can also comprise the periphery of any ports in the seal face (if so provided).

In an alternative situation, the seal face may have a coefficient of thermal expansion that is less than that of the backing ring. In this instance, the thickness of the edge of the seal face is less than that of the middle of the seal face. A disclosed material combination includes a design in which the backing ring is steel and the seal face is made of carbon or expanded graphite.

The anti-crowning relief slot feature can comprise a blind relief slot in the middle of the seal face such that the slot does not go all the way through the seal face to the backing ring. The seal ring may comprise a plurality of such blind relief slots.

The improved seal ring provides for an improved rotary face seal that is suitable for use in a rotary valve. In the rotary valve, the seal ring and the sealing surface each comprises at least one port that come into and out of fluid alignment as the seal ring rotates relative to the sealing surface. The rotary face seal can thereby act as a rotary valve, and is particularly suitable for use in a rotary gas separation device.

As in the aforementioned PCT application number PCT/CA2008/000148, the rotary valve may additionally comprise a seal ring backer in which the seal ring floats with respect to the seal ring backer. This is one possible construction that allows the rotary valve to function as a pressure balanced rotary distributor valve.

BRIEF DESCRIPTION OF THE DRAWINGS

FIG. 4a shows the cross section through a portion of the seal ring where no port is present, while FIG. 4b shows the cross section through a portion where there is a port.

DETAILED DESCRIPTION

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, will control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

Disclosed herein are embodiments of a seal ring for a rotary face seal, embodiments of a rotary valve for use in a rotary gas separation device in which the seal ring is a component, embodiments of a method for reducing the crowning of a face seal due to thermal expansion, and embodiments of a method for producing a fluid product using a rotary gas separation device comprising the seal ring.

The rotary face seal comprises a seal ring in contact with an adjacent sealing surface (typically also ring shaped). The seal ring rotates relative to the sealing surface about the seal ring axis. Depending on the application, either the seal ring or the sealing surface may be stationary. A sealing load also is provided to force the seal ring towards the sealing surface in order to maintain contact between the two and thereby affect a seal. The seal is made between opposing faces of the two contacting components.

For certain disclosed embodiments, the seal ring comprises a seal face bonded to a backing ring. The side of the seal face opposite the backing ring is essentially flat and is in contact with the opposing sealing surface. The seal is thus made between the seal face and the adjacent sealing surface. The materials for these two components must be selected appropriately in order to provide for the desired substantially leak tight or leak tight seal under what may be, in some applications, very demanding operating conditions. The rotation speed and mechanical load forcing the components together contribute to wear and result in friction that increases the overall temperature and the temperature gradients across the components. Further, the components must be able to withstand the temperatures, pressures, and chemical environments of the particular application.

Figure 1:
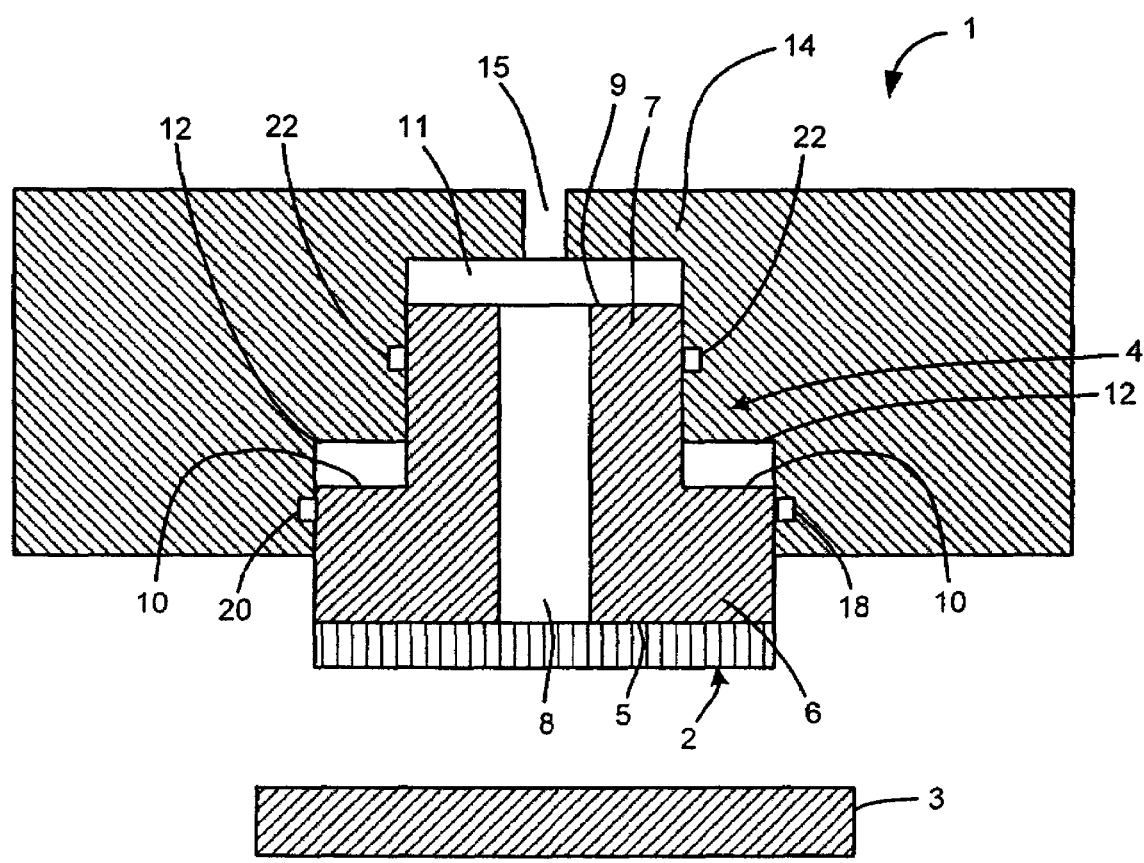
FIG. 1 shows a cross sectional view of a rotary valve used in a rotary gas separation device.
Figure 2:
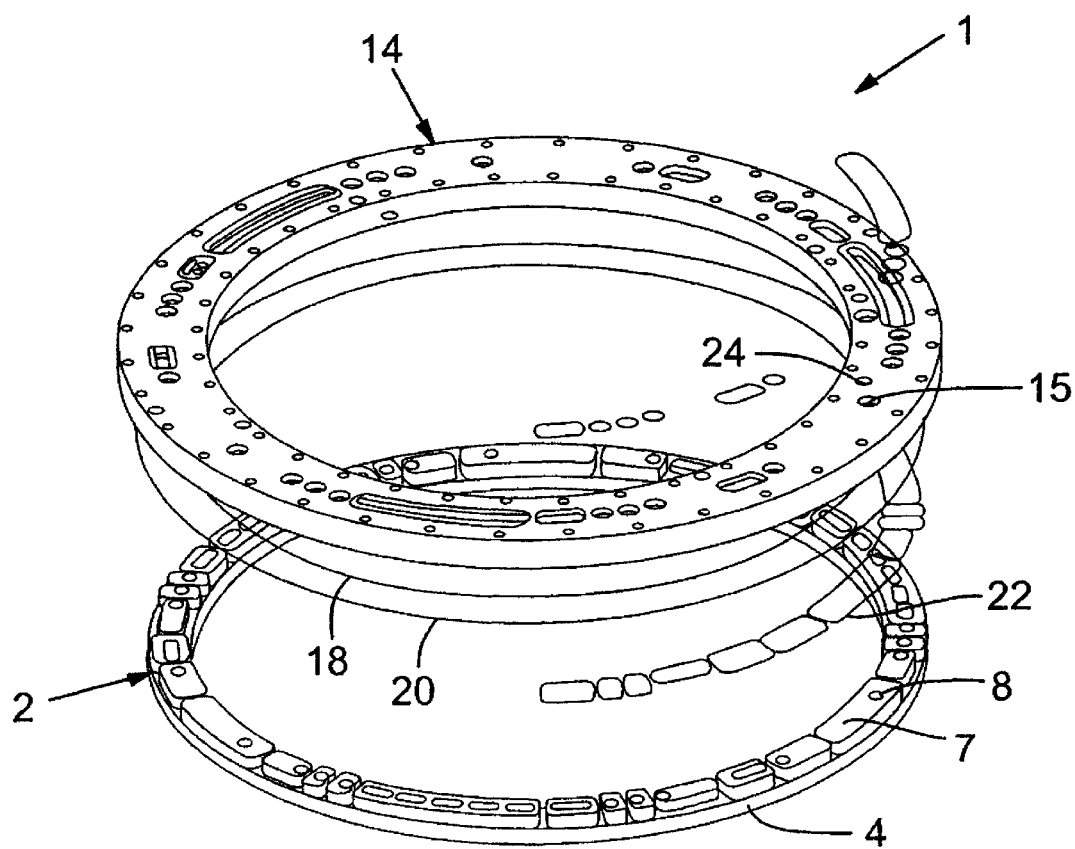
FIG. 2 shows an exploded perspective view of the rotary face seal and seal ring backer components in a rotary valve used in a rotary gas separation device.

Rotary face seals have recently found use as part of unique pressure balanced rotary valves in pressure swing adsorption (PSA) and other gas separation devices. FIGS. 1 and 2 have been excerpted from the aforementioned PCT application number PCT/CA2008/000148 ('148) and illustrate the construction of exemplary rotary valves for use in a rapid cycle PSA device. In this device, multiple adsorbent beds are mounted on a rotor which rotates between stator assemblies provided at both ends of the beds. Process gases are provided to and removed from the feed and product ends of the adsorbent beds via appropriate plumbing incorporated into these stator assemblies. Rotary valves are used at the interfaces between the rotating adsorbent beds and these stator assemblies in order to connect and disconnect the feed gas and product gas ends of the adsorbent beds appropriately to the plumbing in the stator assemblies, in accordance with a desired PSA process cycle.

FIG. 1 shows a cross sectional view of rotary valve 1 which includes seal ring 2 that seals against sealing surface 3 (which is actually the sealing surface of upper rotor end plate in '148). Seal ring 2 comprises backing ring 4 upon which is bonded to seal face 5. Seal face 5 contacts sealing surface 3 in order to create a seal. The illustrated backing ring 4 is a single piece comprising continuous ring-shaped base 6 and a plurality of discrete projections 7. Seal ring 2 mates with stationary seal ring backer 14 and can move vertically or "float" with respect thereto. Seal ring 2 is urged towards sealing surface 3 as a result of a pressurized gas or mixture of gases being admitted to first and second chambers 11, 12. The walls of first and second chambers 11, 12 are defined by opposing surfaces of base 6 and seal ring backer 14. Additional seals, such as O-rings 18, 20, and 22, may be employed to seal base 6 to seal ring backer 14 and thus make chambers 11, 12 substantially leak tight or leak-tight. Process gases that may vary in composition during a pressure swing process and/or vary for different gas separation applications that are obtained from operation of the PSA are admitted to first chamber 11, and pressure from these gases is exerted on top surface 9 of projection 6. Gas is admitted to second chambers 12, such as from an external supply, and pressure from it is exerted onto ledges 10 of base 6. The cross section view of FIG. 1 is taken at a point in which a flow port 8 appears in seal ring 2 and corresponding aperture 15 appears in seal ring backer 14. The view of FIG. 1 is taken at a point in which there is no port in sealing surface 3 however.

FIG. 2 shows an exploded perspective view of rotary valve 1 (except for sealing surface 3, which is not shown in FIG. 2). Apertures 15 (with only one aperture being numbered in FIG. 2) fluidly connect to plumbing in the associated stator assembly (not shown) in order to direct gases appropriately to and from chambers 11 and also to and from the rotating adsorbent beds during operation of the rotary PSA device. Pressurization port 24 also is provided in seal ring backer 14, and is fluidly coupled to an external high-pressure gas source (not shown) and to all the second chambers 12 within rotary valve 1. FIG. 2 illustrates the possible complex arrangement and sizes of projections 7 that may be employed in these pressure balanced rotary valves.

During operation, sealing surface 3 (being part of the rotating assembly comprising the adsorbent beds) is in sliding, sealing contact with seal face 5. However, gas pressures typically vary significantly from bed-to-bed and also within a given bed over the complete process cycle. Thus, the pressure pushing the rotary seal apart varies from place-to-place and also with time at any given place around the rotary face seal. However, the design of rotary valve 1 (e.g. projections 7, first and second chambers 11, 12) compensates for this variation and roughly balances the pressure around the rotary face seal.

Also during operation, rotary valve 1 distributes a mixture of gases or a substantially pure gas to and from the various adsorbent beds at appropriate times during the pressure swing cycle. As the rotor comprising the adsorbent beds rotates, valve action is provided as flow ports 8 in seal ring 2 come into and then out of alignment with corresponding apertures (not shown in FIGS. 1 and 2, but which fluidly connect to ends of the adsorbent beds) in sealing surface 3.

In principle, a variety of materials can be used in the embodiments of FIGS. 1 and 2. For instance, seal face 5 may be made of a polymeric material or materials, such as polyalkylene polymers, particularly halogenated polyalkylene polymers, as exemplified by filled polytetrafluoroethylene. Backing ring 4 may be made of a metal, metal alloy, or combinations thereof, such as carbon steel. Any suitable adhesive, such as epoxy, may be used to bond seal face 5 to backing ring 4. Other components and surrounding structures can also be made of suitable materials, such as metals or metal alloys, such as carbon steel, and/or polymeric materials. And, in particular, sealing surface 3 can be made of cast iron.

While the PSA device is operating, hot flowing gases and friction heat the various components making up the rotary face seal. Temperature gradients can form and the components will expand and can distort. In particular, if the thermal expansion coefficient of face seal 5 is significantly greater than that of backing ring 4, the former wants to expand more than the latter. But, because they are bonded together, seal face 5 then can get distorted. Both a coning (developing a convex shape over the diameter of the seal ring) and a crowning (developing a convex shape over the width of the seal face) of seal ring 2 and seal face 5 can occur.

Figure 3:
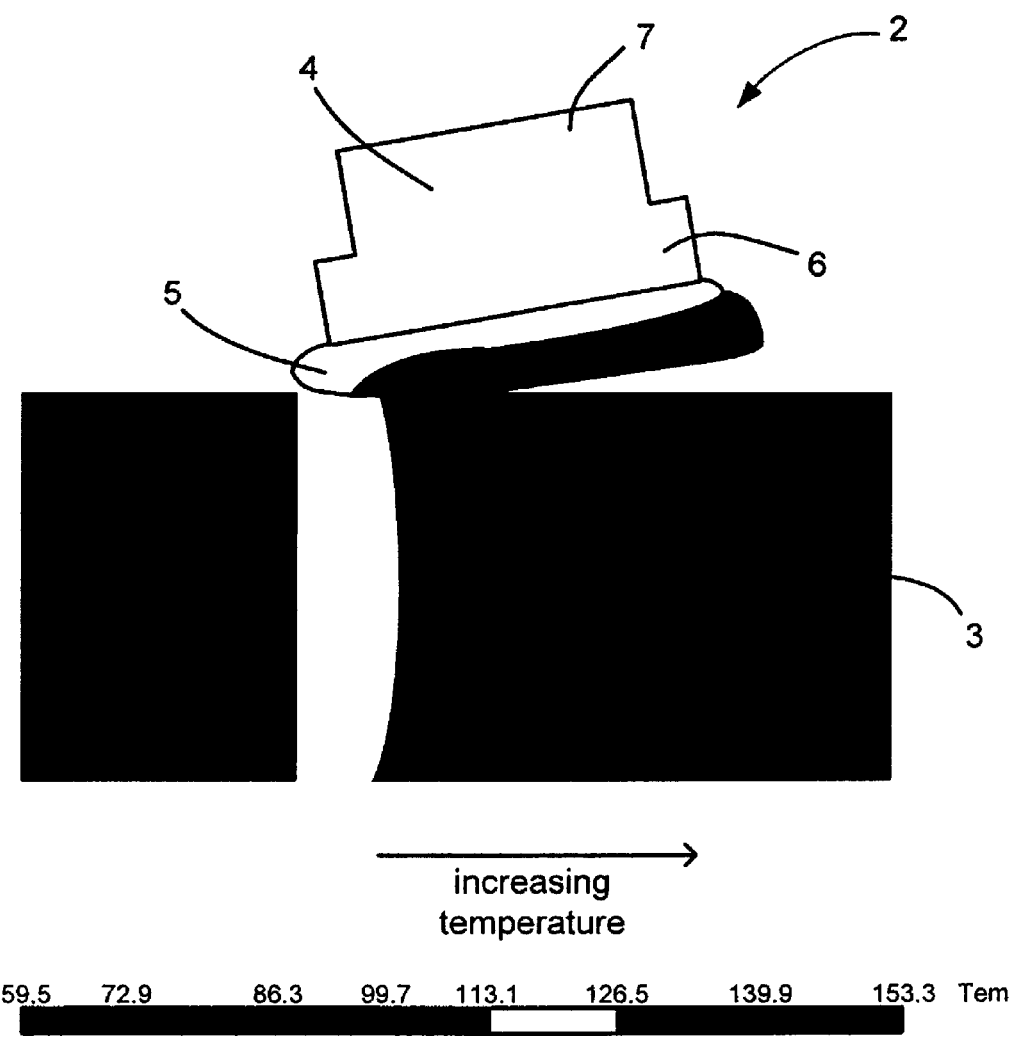
FIG. 3 shows the calculated temperature gradient and exaggerated depiction of the distortion of a rotary face seal during operation at elevated temperature.

FIG. 3 shows a possible thermal distortion scenario for the rotary face seal of FIG. 1 in a realistic application. The direction to the right in FIG. 3 represents the direction away from the axis of rotation (i.e. towards the outer circumference of the rotary face seal). The temperature gradient shown is that calculated to exist in an actual rotary PSA device used to purify hydrogen from a waste stream exhaust of a refinery. In FIG. 3, the temperature rises from about 60° F. (16° C.) at the lower portion of sealing surface 3 to about 150° F. (66° C.) at the upper portion of sealing surface 3. The temperature gradient across seal ring 2 ranges from about 110° F. (43° C.) at the top of projection 7 to about 150° (66° C.) at the hottest part of seal face 5. The tilt (due to coning) shown for seal ring 2 and the distorted shape (due to crowning) shown for seal face 5 are exaggerated depictions (by about 100 times) of the actual tilt and distortion expected as calculated using finite element analysis.

As is evident from FIG. 3, a significant coning and crowning of seal face 5 is expected to occur. In general, coning is not as serious a concern as is crowning because seal ring 2 is not as stiff to bending in this way, and any coning can generally be flattened out under load. However, as areas of seal face 5 expand and crowning occurs, the contact force between seal ring 2 and sealing surface 3 increases. In turn, this results in increased friction, and further heating. Thus, the feedback here leads to instability and eventually the seal can fail (leak) substantially and not recover.

Depending on the situation, it may be possible to work around the possibility of such thermal distortion. For instance, the seal could undergo a lengthy "wear in" procedure at a "wear in" speed and temperature prior to the device being put into service. The "wear in" procedure would be used to wear off the high, expanded areas of the distorted seal under suitable controlled conditions. Aside from the effort required to do this, a drawback of using a wear in procedure is that the seal may still be sensitive to changes to process temperature. Another option may be to employ a much thinner seal face which would reduce the magnitude of the distortion. However, this can lead to a reduction in lifetime.

Alternatively, it may be possible to reduce the component temperature by choosing lower coefficient of friction materials or operating speeds. Further, lower process gas temperatures might be considered. Or, higher gas flow rates might be considered to remove heat.

However, it is preferable not to be limited to any of the preceding design or operation restrictions. Instead, or optionally in combination with such design or operating restrictions, we have found that certain structural features can be incorporated into the seal ring so as to significantly reduce the thermal distortion seen due to crowning. The distortion can be reduced by the use of a variable thickness seal face, whose thickness at the edges differs appropriately from that in the middle. Distortion can also be reduced by incorporating expansion relief slots in the seal face.

A person of ordinary skill in the art will appreciate that terms such as "thicker," "thinner," and variations thereof, such as "thickness," particularly with reference to the seal face, can vary from application-to-application, and that these terms can be defined with reference to the desired result, or results, to be obtained. For example, the seal face may be thicker at the edges, such that during operation the sealing surface remains substantially flat to provide a suitable seal with the seal face. Without being limited to particular thicknesses or thickness variations, the thickness variation typically is from greater than 0 to at least about 0.1 inch, more typically from greater than 0 to at least about 0.04 inch, and for certain disclosed embodiments the thickness variation over the seal ring was from about 0.001 inch to about 0.0025 inch.

A person of ordinary skill in the art also will appreciate that references to differences in coefficients of thermal expansion can vary from application-to-application, particularly with variations in material choices. Solely by way of example, statements such as the seal face has a coefficient of thermal expansion that is greater than that of the backing ring means that the difference in the coefficients of thermal expansion is greater than zero up to at least about $10 \times 10^{-5}$ $K^{-1}$.

Figure 4A:
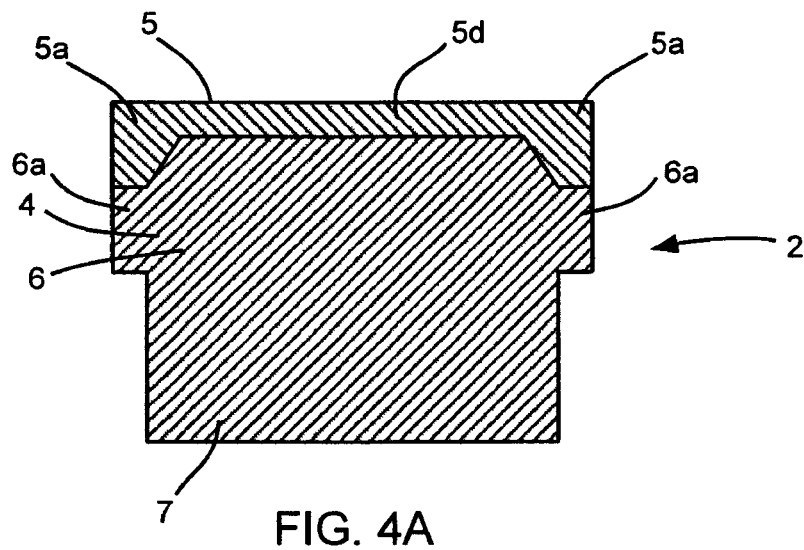
FIGS. 4a and 4b show cross sectional views of a seal ring for a rotary face seal in which the edges of the seal face are thicker than the middle of the seal face.

FIGS. 4a and b show embodiments of a seal ring, for a rotary face seal like that shown in FIGS. 1 and 2, in a situation where the thermal coefficient of expansion of the seal face material is greater than that of the base. In these Figures, the thicknesses of the edges of the seal face are greater than that in the middle of the seal face. FIG. 4c is provided for comparative purposes and shows the same seal ring view as FIG. 4a except that the seal face is uniformly thick throughout.

Figure 4B:
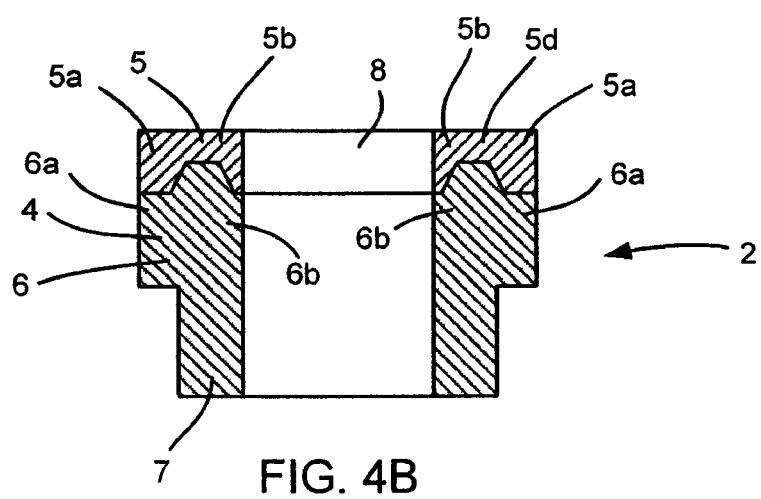
Figure 4C:
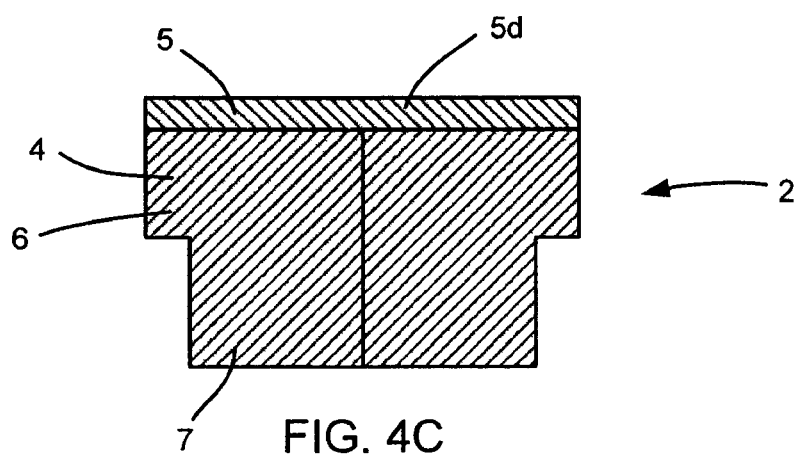
FIG. 4c shows, for comparative purposes, the same seal ring view as FIG. 4a except that the seal face is uniformly thick throughout.

FIG. 4a shows the cross section through a portion of seal ring 2 where no flow port is present, while FIG. 4b shows the cross section through a portion which includes a flow port 8. In both, the edges 5a, 5b of seal face 5 are thicker than the middle 5d of seal face 5. In FIGS. 4a and 4b, edges 5a are located at the inner and outer circumferences of seal ring 5. In FIG. 4b, there are additional edges 5b which are located at the periphery of flow port 8. (Herein, the term middle refers to those parts of the seal ring located away from the edges. Thus, the area denoted 5d in FIG. 4b is also in the "middle".)

Preferably the sealing side of seal face 5 is essentially flat and stays flat during operation at elevated temperature. To accommodate the thicker edges of seal face 5, the base 6 of backing ring 4 is made correspondingly thinner at those locations 6a, 6b adjacent the thicker seal face edges 5a, 5b.

In the embodiment of FIG. 4c, when the components are subjected to elevated temperature, seal face 5 expands and tends to crown by becoming thicker in the middle 5d than at the edges. However, in FIGS. 4a and 4b, with the seal face now thicker at the edges, when subjected to elevated temperature, seal face edges 5a, 5b expand more than the middle 5d because of the additional material there. And so at the sealing side of seal face 5, edges 5a, 5b now expand so as to "catch up" to middle 5d, resulting in a flatter, expanded seal face 5 and thus one with reduced crowning. Those in the art will appreciate that the various dimensions required at the modified edges of these components will depend on the other component dimensions, component material types, and operating parameters. It is expected that those skilled in the art will readily be able to determine suitable sets of dimensions in order to significantly reduce crowning and maintain a flatter seal at elevated temperatures.

Figure 5A:
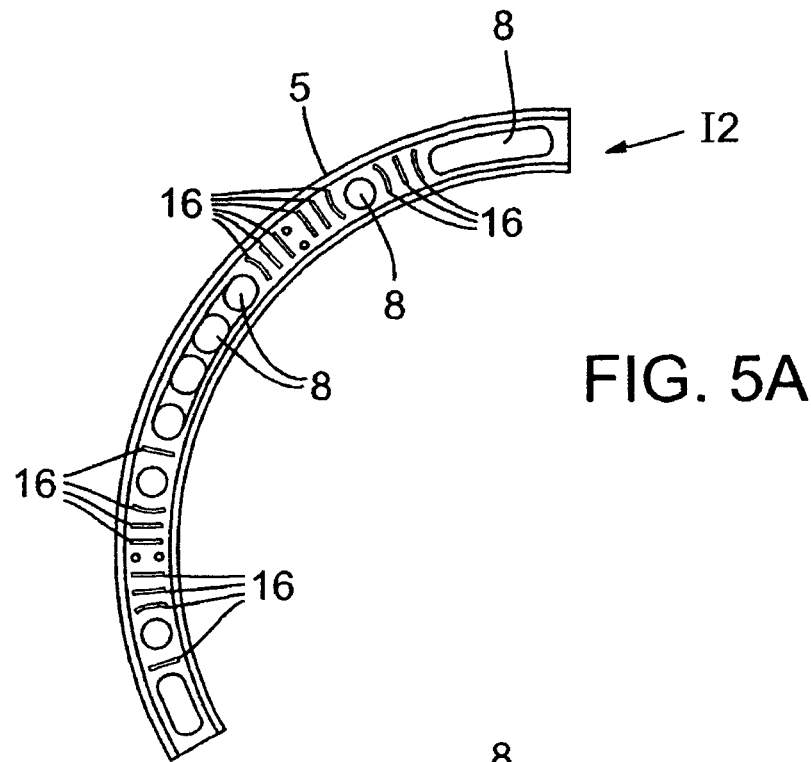
FIG. 5a shows a plan view of a portion of the seal face side of a seal ring in which the seal face comprises relief slots.
Figure 5B:
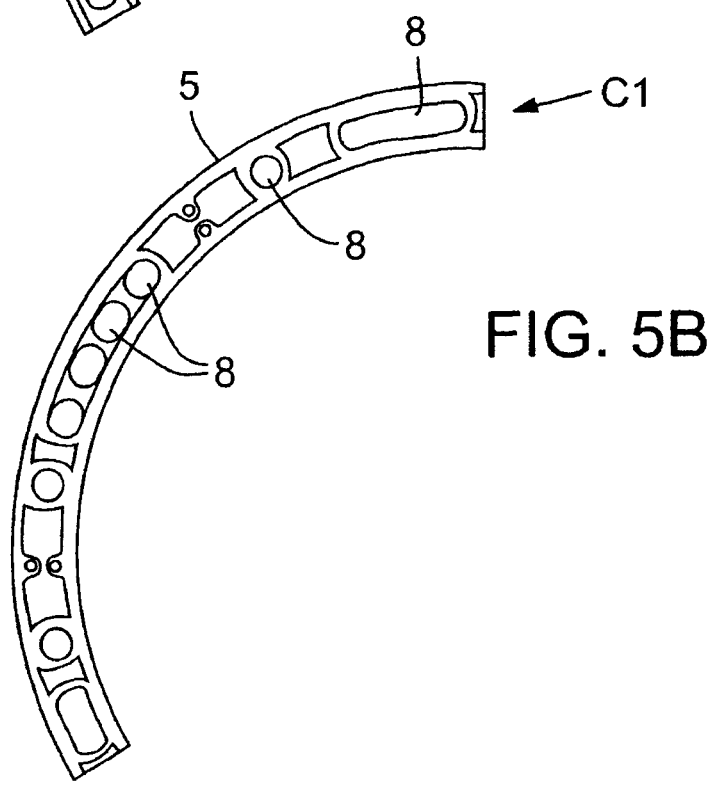
FIG. 5b shows, for comparative purposes, the same view of a portion as FIG. 5a except that the seal face has no relief slots.

FIGS. 5a and 5b also show embodiments of a seal ring, again for possible use in a rotary face seal like that shown in FIGS. 1 and 2, and for use in a situation where the thermal coefficient of expansion of the seal face material is greater than that of the base. FIG. 5a shows a plan view of a portion of the seal face side 5 of the seal ring in which the seal face comprises relief slots 16. For comparative purposes, FIG. 5b shows the same view as FIG. 5a except that the seal face has no relief slots. (Note: the various shadings shown in FIGS. 5a and 5b represent various thickness increases at elevated temperature as determined by finite element analysis in the Examples to follow. The range of these thickness increases are reported numerically in the Examples.)

In both FIGS. 5a and 5b, seal face 5 and numerous flow ports 8 are visible. FIG. 5a also shows numerous relief slots 16 that have been incorporated into face seal 5. In the embodiment shown, relief slots 16 only partially go through seal face 5 and are thus "blind" slots. It can be preferred to employ blind slots in order to prevent any gas in the slots from accessing the underlying surface of backing ring 4, and thereby protecting the bond between the two (against delamination). In general, the presence of relief slots 16 allows the material of seal face 5 to expand laterally with temperature (i.e. parallel to base 6) instead of expanding normal to base 6. As a result, crowning of seal face 5 in these areas is reduced. It can thus be desirable to introduce relief slots into those larger, continuous middle regions of seal ring 2 lying between various flow ports 8. As a rule of thumb, an equidistant spacing between the relief slots may be employed, but equivalent spacing is not required.

As exemplified herein, seal ring 2 is intended to be part of the stator assemblies in a rapid cycle rotary PSA device. In other embodiments however, seal ring 2 could instead be part of the rotor. In this case, fewer relief slots may be needed because the flow ports would be expected to be closer together (i.e. the continuous middle regions of seal ring 2 will be smaller).

Either or both of the anti-crowning features described above reduce the problems associated with crowning at elevated temperature. (In fact, the anti-crowning features are also effective in correcting for changes which occur when the temperature is reduced.)

The embodiments depicted in the preceding Figures address situations in which the thermal expansion coefficient of the seal face is significantly greater than that of the backing ring. However, in other situations, the seal face may instead have a coefficient of thermal expansion that is less than that of the backing ring. For instance in some applications, the seal face material might desirably be a carbonaceous material (e.g. carbon or carbon-graphite) with the backing ring being steel. When a seal ring using these components is heated up, the tendency now is for the edges of the seal face to expand more than the middle, thereby resulting in a concave shaped seal face. To reduce this inverse crowning, the thickness of the edge of the seal face may now instead be made less than that of the middle of the seal face. When such an embodiment is now heated up, the middle of the seal face expands more than the edges because of the additional material there. And so in this case, the thickness of the middle increases and "catches up" to the expanded edges, thereby reducing the crowning. This inverse crowning may not be as serious an issue in some applications. For instance, in the application for a rotary valve in a rapid cycle PSA device discussed here, this situation leads to a more favorable feedback. Here, when the temperature increases and the edges of the seal face expand more than the middle, gas within flow port 8 can leak into space created between seal face 5 and sealing surface 3. This reduces the contact force between the two, thereby weakening the seal made at the expanded edges. Under these conditions, it has been found that gas can leak out more at the edges, thereby cooling the expanded edges of seal face 5, and as a consequence resulting in a return of seal face 5 to its original flat shape. This feedback is favorable and provides some inherent stability to the seal.

The anti-crowning features of the present invention provide a more stable shape to rotary face seals subjected to significant temperature variations. The following examples have been provided to illustrate certain representative aspects of the invention, but should not be construed as limiting in any way.

EXAMPLES

In the following examples, model calculations were carried out on seal ring structures similar to those shown in FIGS. 1 and 2 and that are intended for use in a rapid cycle rotary PSA device that separates hydrogen from refinery waste gas streams. Each seal ring was assumed to have the following dimensions: 45" (114 cm) outside diameter, 39" (99 cm) inner diameter (hence width of seal ring was 3" (8 cm)). The backing ring was always assumed to be made of a conventional steel (ASME SA-516 GR70), about 1.65" (4.2 cm) in overall thickness, and having a coefficient of thermal expansion (CTE) of $1.2 \times 10^{-5}$ $K^{-1}$. Two types of polymeric materials were considered as the seal face material. Also, several seal face structures were considered, some with and some without anti-crowning features of the invention.

Comparative seal ring example C1 was assumed to be shaped similar to that shown in FIG. 4c at 20° C. The seal face was made of Vertec 1215A, a carbon-filled PTFE with some additional $MoS_2$ content made by Vertec and having a CTE of $11.5 \times 10^{-5}$ $K^{-1}$. The seal face was 0.2" (0.5 cm) thick.

Comparative seal ring example C2 was assumed to be like that of C1 except that the seal face was made of EGC A-90 PTFE, another carbon filled PTFE made by EGC. This material has a CTE of $8.35 \times 10^{-5}$ $K^{-1}$. This is closer to the CTE of the backing ring than is the material of example C1 and thus is a better choice for reducing thermal distortion. In addition, the C2 material has better storage modulus characteristics above about 100° C. than does C1. The two materials have a similar modulus up to about 100° C. The storage modulus is determined using dynamic mechanical analysis and is indicative of the elastic component of a viscoelastic material when subjected to strain.

Inventive seal ring example I1 was assumed to be shaped similar to that shown in FIGS. 4a and 4b at 20° C. but was otherwise the same as comparative example C2. Edges 5a and 5b of the seal face were thus thicker than in the middle. At edges 5a, the thickness was 0.4" (1.0 cm). At edges 5b (the periphery of the flow ports), the thickness was 0.36" (0.91 cm). Abrupt changes in thickness between edges 5a, 5b and the middle 5d were avoided. Instead, sloping linear transitions were used between these various regions.

Inventive seal ring example I2 was assumed to be similar to I1 except that a plurality of blind relief slots were incorporated in the seal face as shown in the sections of FIGS. 5a and 5b. These slots extended to a depth of about 80-90% of the seal face thickness.

Finite element analyses were then performed on the various example seal rings under the temperature conditions expected in this refinery application. In each case, the backing ring temperature was assumed to be 40° C. throughout. The seal face surface adjacent the backing ring was thus also 40° C. The opposite seal face surface (which would be contacting the sealing surface) was taken to be 80° C. There was therefore a temperature gradient of 40° C. across the seal face.

Figure 6A:
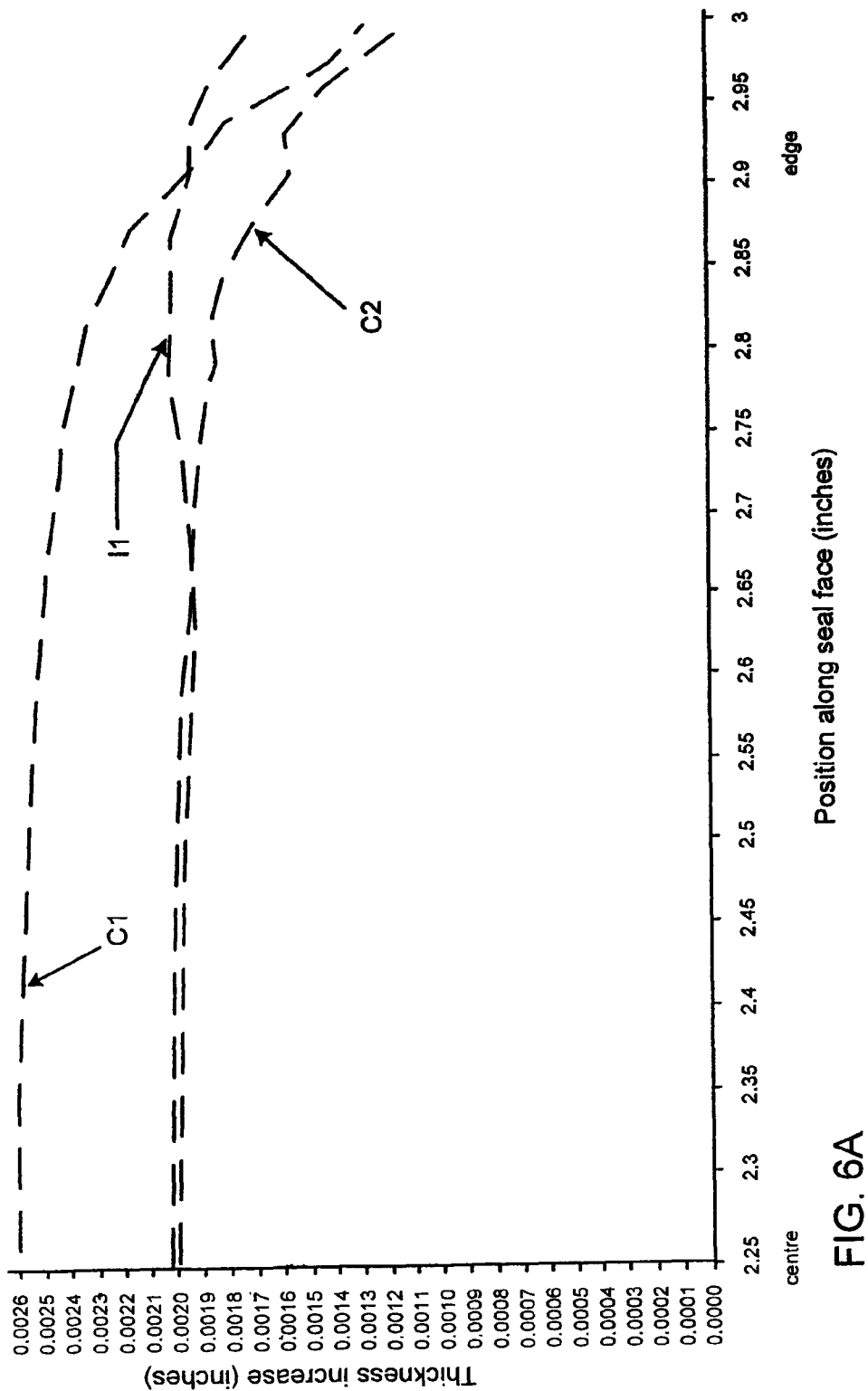
FIG. 6a shows the calculated thickness increase (inches) across a section of the seal face away from a port, at the elevated temperature conditions indicated in the Examples.
Figure 6B:
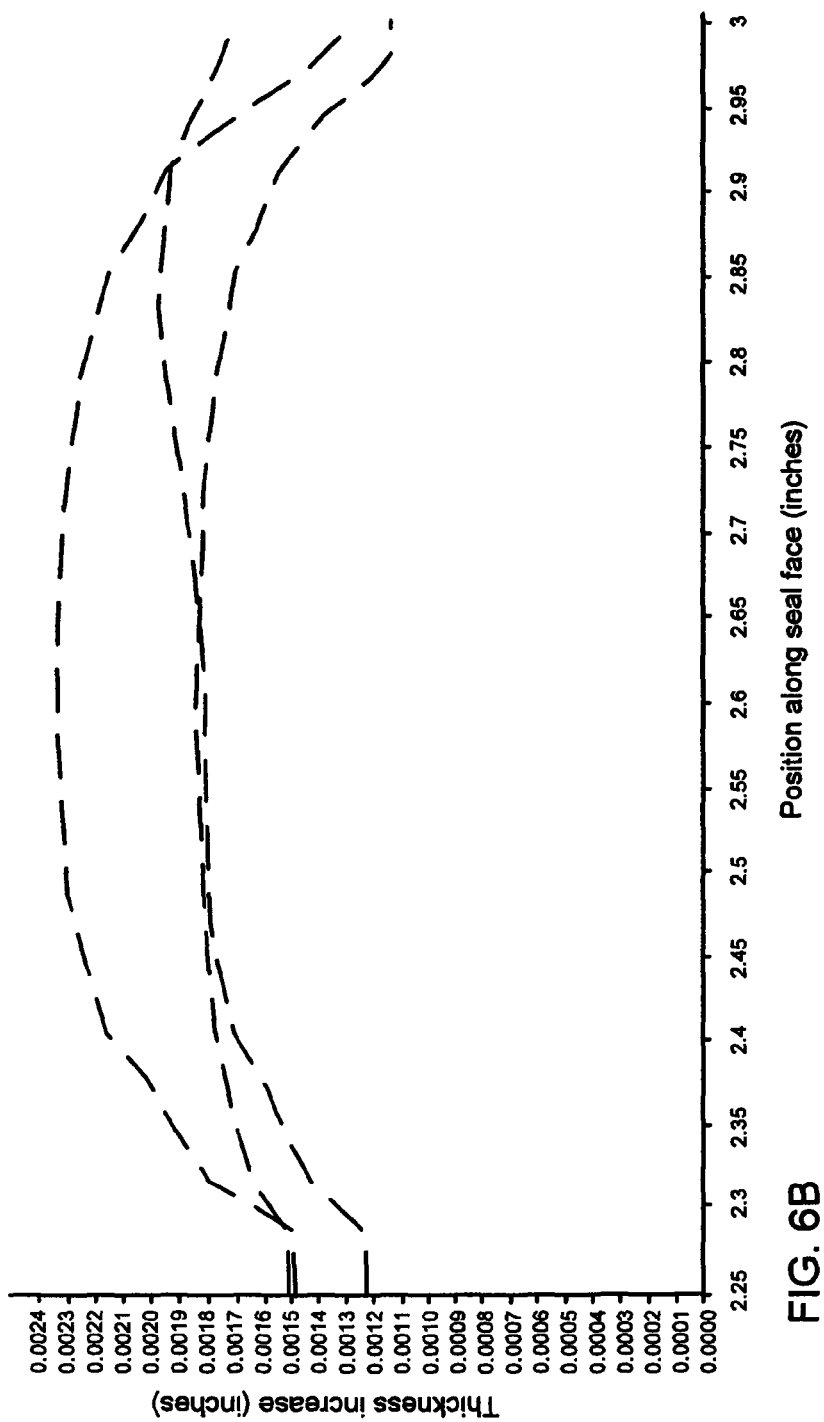
FIG. 6b shows the calculated thickness increase (inches) across a section of the seal face at a port, at the elevated temperature conditions indicated in the Examples.

FIG. 6a shows the calculated thickness increase, at these elevated temperature conditions, across the width of the seal face near the edge (i.e. starting from a point equivalent to the location of the perimeter of the flow ports and extending to the outside circumference of the seal face) in a region of seal rings C1, C2, and I1 away from any flow port. The thickness increase for the other edge of the seal face would be a mirror image of that shown. In a like manner, FIG. 6b shows the calculated thickness increase across the width of the seal face near the edge for the same seal rings, but at a flow port location. The original seal ring constructions at 20° C. were all initially flat and thus would lie along the x axis if plotted on each of these figures.

As expected from their respective CTEs, the C2 seal ring showed less expansion than the C1 seal ring. However both show significant crowning of the seal face, as is apparent from the markedly greater expansion seen at the centre than at the outer edges. In FIG. 6a, seal ring I1 however shows a much flatter plot than that of C2 (3.5 times flatter). The crowning effect has been reduced. In fact, the heated seal ring I1 is actually slightly higher at the edges than it is in the middle. As mentioned previously, this is a more stable situation for the seal than the reverse. If anything, the expansion at the edges of the seal face allows gas to leak between the seal face and the sealing surface, thereby reducing the contact force therebetween. This allows more gas to leak out past the edges of the seal, resulting in a general cooling at the edges and a return to the original shape. In a like manner, FIG. 6b shows a markedly flatter expansion plot for seal ring I1 than for seal ring C2 (approximately 2.5 times flatter).

Finite element analysis also showed the effectiveness of the relief slots incorporated in seal ring I2. Under the simulated elevated temperature conditions, the thickness increase over the seal ring C1 ranged from 0.0011" to 0.0025" (28 to 64 μm), or a 0.0014" (36 μm) range. The largest increases occurred in the larger areas between the flow ports. However, the thickness increase over seal ring I2 ranged only from 0.0006" to 0.0010" (15 to 25 μm), or a 0.004" (10 μm) range. While this reduced total expansion of seal ring I2 is partly the result of the difference in CTE between the materials, the presence of the relief slots provided additional flattening of the seal face in the regions between the flow ports.

The preceding examples are illustrative of the improvements that may be obtained for rotary face seals for use in rotary PSA devices. Those in the art will appreciate however that the anti-crowning features of the improved seal ring can be useful in other applications in which thermal stability of face seal components is an issue.

Thus, in view of the many possible embodiments to which the principles of the disclosed invention may be applied, it should be recognized that the illustrated embodiments are only preferred examples of the invention and should not be taken as limiting the scope of the invention.

We claim:

1. A rotary face seal, comprising a seal ring, comprising a seal face bonded to a backing ring, a side of the seal face opposite the backing ring being essentially flat, the seal ring having as an anti-crowning feature a thickness of an edge of the seal face that is different from that of a middle portion of the seal face, wherein the seal face contacts a sealing surface.

2. The rotary face seal of claim 1 further comprising at least one port through both the seal face and the backing ring.

3. The rotary face seal of claim 1 wherein the seal face has a coefficient of thermal expansion that is greater than a coefficient of thermal expansion of the backing ring, and wherein a thickness of an edge of the seal face is greater than that of a middle portion of the seal face.

4. The rotary face seal of claim 3 wherein the backing ring is correspondingly thinner adjacent a thicker edge of the seal face such that the side of the seal face opposite the backing ring contacts a sealing surface and is essentially flat.

5. The rotary face seal of claim 3 wherein an inner circumference of the seal face has a thicker edge than that of a middle portion of the seal face.

6. The rotary face seal of claim 3 wherein an outer circumference of the seal face has a thicker edge than that of a middle portion of the seal face.

7. The rotary face seal of claim 3 wherein both an inner circumference and an outer circumference of the seal face have thicker edges than that of a middle portion of the seal face.

8. The rotary face seal of claim 2 wherein the seal face has a coefficient of thermal expansion that is greater than a coefficient of thermal expansion of the backing ring, and wherein a thickness of an edge of the seal face is greater than that of a middle portion of the seal face.

9. The rotary face seal of claim 8 wherein the backing ring is correspondingly thinner adjacent a thicker edge of the seal face such that the seal face opposite the backing ring contacts the sealing surface and is essentially flat.

10. The rotary face seal of claim 8 wherein an inner circumference of the seal face has a thicker edge than that of a middle portion of the seal face.

11. The rotary face seal of claim 8 wherein an outer circumference of the seal face has a thicker edge than that of a middle portion of the seal face.

12. The rotary face seal of claim 8 wherein both an inner circumference and an outer circumference of the seal face have thicker edges than that of a middle portion of the seal face.

13. The rotary face seal of claim 2 wherein the seal face has a coefficient of thermal expansion that is greater than a coefficient of thermal expansion of the backing ring, the seal face has a first edge located at a periphery of the port in the seal face, the seal face has a second edge located at an outer circumference of the seal face, and the first edge and the second edge are thicker than a middle portion of the seal face located between the first edge and the second edge.

14. The rotary face seal of claim 1 wherein the seal face has a coefficient of thermal expansion that is less than a coefficient of thermal expansion of the backing ring, and wherein a thickness of an edge of the seal face is less than that of a middle portion of the seal face.

15. The rotary face seal of claim 14 wherein the backing ring is correspondingly thicker adjacent a thinner edge of the seal face such that the side of the seal face opposite the backing ring contacts the sealing surface and is essentially flat.

16. The rotary face seal of claim 14 wherein an inner circumference of the seal face has a thinner edge than that of a middle portion of the seal face.

17. The rotary face seal of claim 14 wherein an outer circumference of the seal face has a thinner edge than that of a middle portion of the seal face.

18. The rotary face seal of claim 14 wherein both an inner circumference and an outer circumference of the seal face have thinner edges than that of a middle portion of the seal face.

19. The rotary face seal of claim 2 wherein the seal face has a coefficient of thermal expansion that is less than a coefficient of thermal expansion of the backing ring, and wherein a thickness of an edge of the seal face is less than that of a middle portion of the seal face.

20. The rotary face seal of claim 19 wherein the backing ring is correspondingly thicker adjacent a thinner edge of the seal face such that the seal face opposite the backing ring contacts a sealing surface and is essentially flat.

21. The rotary face seal of claim 19 wherein an inner circumference of the seal face has a thinner edge than that of a middle portion of the seal face.

22. The rotary face seal of claim 19 wherein an outer circumference of the seal face has a thinner edge than that of a middle portion of the seal face.

23. The rotary face seal of claim 19 wherein both an inner circumference and an outer circumference of the seal face have thinner edges than that of a middle portion of the seal face.

24. The rotary face seal of claim 2 wherein the seal face has a coefficient of thermal expansion that is less than a coefficient of thermal expansion of the backing ring, the seal face has a first edge located at a periphery of the port in the seal face, the seal face has a second edge located at an outer circumference of the seal face, and the first edge and the second edge are thinner than a middle portion of the seal face located between the first edge and the second edge.

25. The rotary face seal of claim 1 wherein the backing ring is made from a metal, a metal alloy, or combinations thereof.

26. The rotary face seal of claim 25 wherein the backing ring is made from steel.

27. The rotary face seal of claim 1 wherein the seal face is made from a polyalkylene polymer.

28. The rotary face seal of claim 1 wherein the seal face comprises a carbon-filled polytetrafluoroethylene.

29. The rotary face seal of claim 1 wherein the seal face has a blind relief slot in a middle portion thereof, the blind relief slot extending from the side of the seal face opposite the backing ring and partially through the seal face.

30. The rotary face seal of claim 1 wherein the seal face comprises a plurality of blind relief slots, each of the plurality of blind relief slots extending from the side of the seal face opposite the backing ring and partially through the seal face.

31. The rotary face seal of claim 30 where the plurality of blind relief slots are substantially equally spaced from one another.

32. The rotary face seal of claim 30 where the plurality of blind relief slots are unequally spaced from one another.

33. A rotary face seal, comprising a seal ring having a seal face bonded to a backing ring, a seal ring backer and a sealing surface, the seal ring having as an anti-crowning feature a thickness of an edge of the seal face that is different from that of a middle portion of the seal face, wherein the seal face contacts the sealing surface.

34. The rotary face seal according to claim 33 where the seal ring rotates relative to the sealing surface about a seal ring axis and a sealing load urges the seal ring towards the sealing surface causing a plurality of projections on the backing ring to mate with a plurality of chambers in the seal ring backer, and wherein a side of the seal face opposite the backing ring contacts the sealing surface and is essentially flat.

35. The rotary face seal of claim 33 further comprising at least one port through both the seal face and the backing ring.

36. The rotary face seal of claim 33 wherein the seal face has a coefficient of thermal expansion that is greater than a coefficient of thermal expansion of the backing ring, and wherein a thickness of an edge of the seal face is greater than a thickness of a middle portion of the seal face.

37. The rotary face seal of claim 35 wherein the seal face has a coefficient of thermal expansion that is greater than a coefficient of thermal expansion of the backing ring and a thickness of an edge of the seal face is greater than that of a middle portion of the seal face.

38. The rotary face seal of claim 37 wherein the backing ring is correspondingly thinner adjacent a thicker edge of the seal face such that a side of the seal face opposite the backing ring contacts the sealing surface and is essentially flat.

39. The rotary face seal of claim 35 wherein the seal face has a coefficient of thermal expansion that is greater than a coefficient of thermal expansion of the backing ring, the seal face has a first edge located a periphery of the port in the seal face, the seal face has a second edge located at an outer circumference of the seal face, and the first edge and the second edge are thicker than a middle portion of the seal face located between the first edge and the second edge.

40. The rotary face seal of claim 33 wherein the seal face has a coefficient of thermal expansion that is less than a coefficient of thermal expansion of the backing ring and a thickness of an edge of the seal face is less than a thickness of a middle portion of the seal face.

41. The rotary face seal of claim 35 wherein the seal face has a coefficient of thermal expansion that is less than a coefficient of thermal expansion of the backing ring and a thickness of an edge of the seal face is less than a thickness of a middle portion of the seal face.

42. The rotary face seal where of claim 33 where the seal face comprises a blind relief slot in a middle portion thereof, the blind relief slot extending from a side of the seal face opposite the backing ring and partially through the seal face.

43. The rotary face seal of claim 33 where the seal face comprises a plurality of blind relief slots, each of the plurality of blind relief slots extending from a side of the seal face opposite the backing ring and partially through the seal face.

44. The rotary face seal of claim 43 where the plurality of blind relief slots are substantially equally spaced from one another.

45. A rotary face seal, comprising a seal ring, comprising a seal face bonded to a backing ring, a side of the seal face opposite the backing ring being essentially flat, the seal ring having as an anti-crowning feature a blind relief slot extending from the side of the seal face opposite the backing ring and partially through the seal face, wherein the seal face contacts a sealing surface.

46. The rotary face seal of claim 45, wherein the blind relief slot is located in a middle portion of the seal face.

47. The rotary face seal of claim 45, further comprising a plurality of blind relief slots extending from the side of the seal face opposite the backing ring and partially through the seal face, wherein the plurality of blind relief slots are substantially equally spaced from one another.

48. The rotary face seal of claim 45, further comprising a plurality of blind relief slots extending from the side of the seal face opposite the backing ring and partially through the seal face, wherein the plurality of blind relief slots are unequally spaced from one another.

49. The rotary face seal of claim 45, wherein the seal face has a coefficient of thermal expansion that is different than a coefficient of thermal expansion of the backing ring.

50. The rotary face seal of claim 45, further comprising at least one flow port extending through both the seal face and the backing ring.

* * * * *